UNITED STATES PATENT OFFICE.

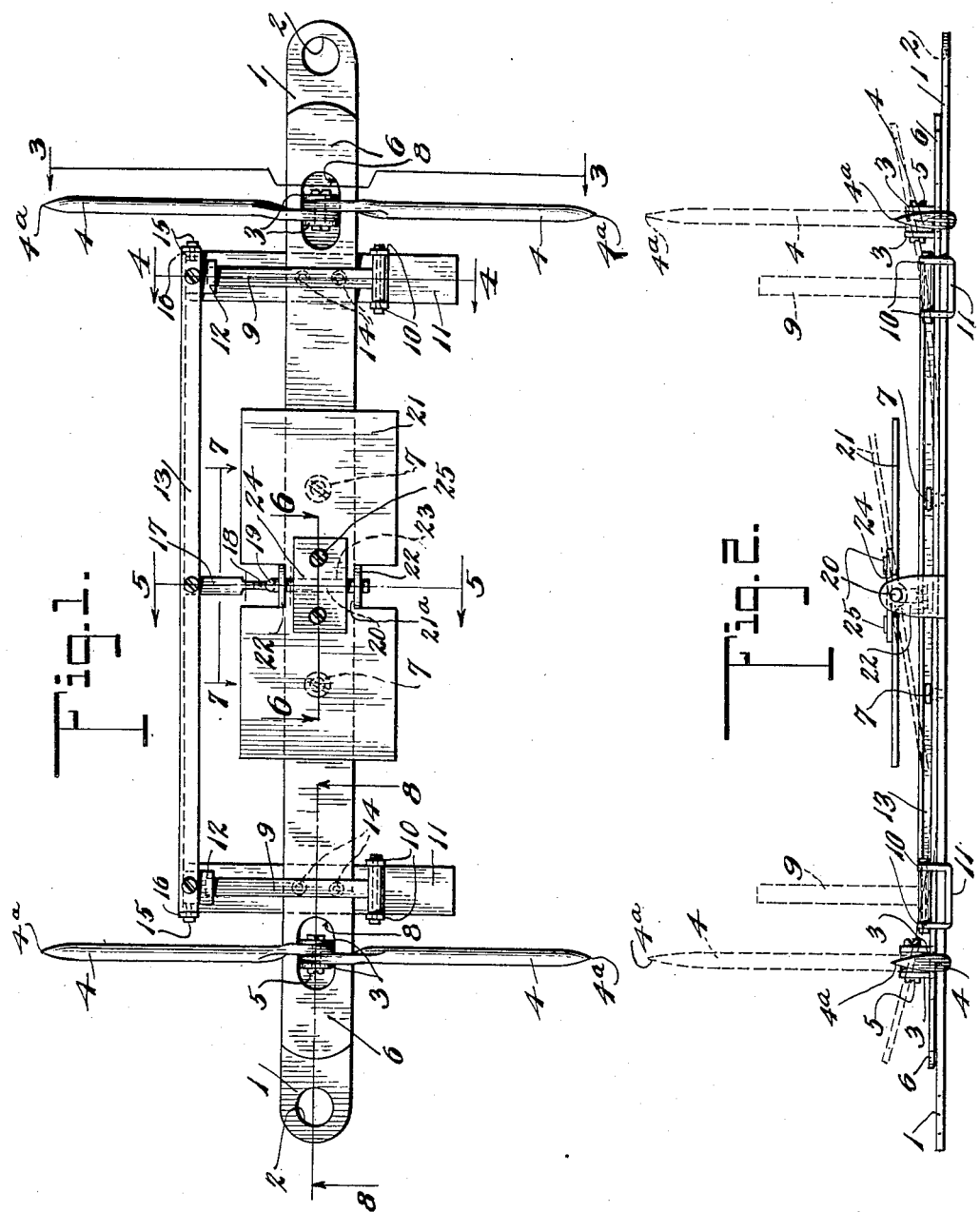

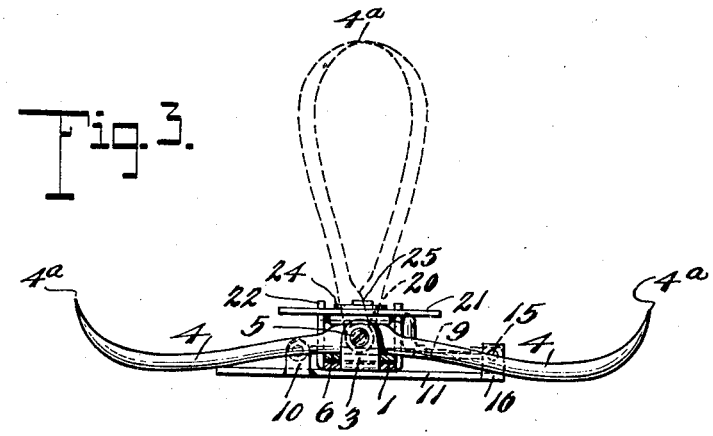
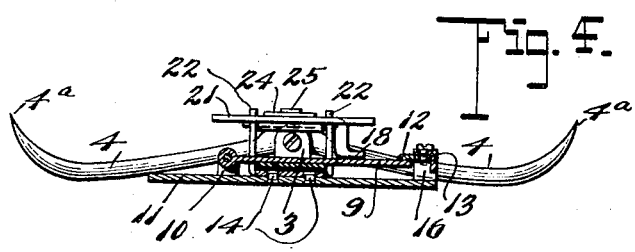
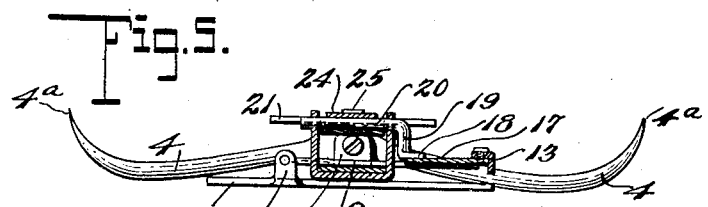
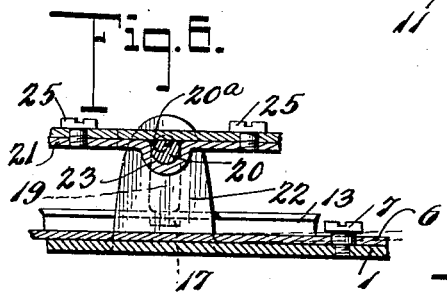
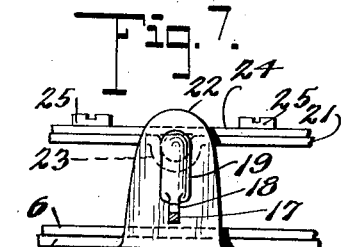

SIDNEY A. WHITLEY, OF GREENSBORO, NORTH CAROLINA.

ANIMAL-TRAP.

1,363,943.     Specification of Letters Patent.     Patented Dec. 28, 1920.

Application filed April 27, 1920. Serial No. 376,930.

*To all whom it may concern:*

Be it known that I, SIDNEY A. WHITLEY, a citizen of the United States, residing at Greensboro, in the county of Guilford and State of North Carolina, have invented certain new and useful Improvements in Animal-Traps, of which the following is a specification.

The present invention relates to certain new and useful improvements in animal traps, and has for its object to provide a device of this character which embodies novel features of construction whereby it can be readily carried from place to place and set in operative position, and will act in an effective manner to grasp and hold any animal coming within the zone of the jaws and springing the trap.

Further objects of the invention are to provide a trap of this character which is comparatively simple and inexpensive in its construction, which will withstand rough handling without danger of breaking or getting out of adjustment, and which when placed in a runway will act in an equally effective manner to catch an animal approaching from either direction.

With these and other objects in view the invention consists in certain combinations, arrangements, and association of the parts, as will more fully appear as the description proceeds, the novel features thereof being pointed out in the appended claims.

For a full understanding of the invention reference is to be had to the following description and accompanying drawings, in which:

Figure 1 is a top plan view of an animal trap constructed in accordance with the invention, the trap having both sets of jaws open and being in a "set" position.

Fig. 2 is a side elevation of the trap, showing the same in a "set" position by full lines, and in a "sprung" position by dotted lines.

Fig. 3 is an end view of the trap, the jaws being shown in an open position by full lines, and in a closed position by dotted lines.

Fig. 4 is a sectional view on the line 4—4 of Fig. 1, looking in the direction of the arrows.

Fig. 5 is a similar view taken on the line 5—5 of Fig. 1.

Fig. 6 is a similar view taken on the line 6—6 of Fig. 1.

Fig. 7 is a similar view taken on the line 7—7 of Fig. 1.

Fig. 8 is a similar view taken on the line 8—8 of Fig. 1.

Corresponding and like parts are referred to in the following description and indicated on all of the views of the drawing by the same reference characters.

Referring to the drawings, which illustrate one possible embodiment of the invention, the numeral 1 designates an elongated base plate which is provided at its ends with eyes 2 by means of which the usual chain or cable can be attached thereto. A pair of transversely disposed ears 3 project upwardly from the base plate at points spaced from the ends thereof, said ears being preferably stamped from the base plate and pressed upwardly therefrom. Pivotally mounted between each pair of the ears 3 is a pair of jaws 4. These jaws are in the form of arms of which the outer ends are curved upwardly and sharpened at $4^a$, while the inner ends are pivoted upon the pins 5 connecting the ears 3. When the trap is set the jaw arms 4 are swung outwardly into a substantially horizontal position so as to rest flat upon the ground, as indicated by Figs. 4 and 5. However, when the trap is sprung the jaws are forcibly swung upwardly and the pointed ends $4^a$ thereof moved toward each other so as to grip any animal or object which may have been between the jaws. The position of the jaws when they are brought together is indicated by dotted lines on Fig. 3.

The actuating spring 6 is in the form of a resilient strip which extends along the top of the base plate and is permanently fastened to the intermediate portion of the base plate by suitable fastening members 7. The end portions of the spring 6 are formed with clearance openings 8 which are adapted to receive the upstanding ears 3 of the base plate and to engage the pivot ends of the jaws to swing the jaws upward when the trap is sprung. The end portions of the spring 6 are adapted to be held in inoperative position against the base plate 1 by means of pivoted latch members 9. These latch members are duplicated at opposite ends of the base plate and extend transversely thereof, being pivoted at one end between ears 10 projecting upwardly from cross pieces 11, and having the free ends thereof engaged by detents 12 on a release bar 13. The cross pieces 11 are rigidly secured to the base plate 1 by suitable fastening members 14, and the release bar 13 is arranged in a parallel and spaced relation to the base plate with the ends thereof pivoted at 15 between arms 16 projecting upwardly from the cross pieces 11. The release bar 13 is shown as having an angle iron formation and as being mounted to rock about a longitudinal axis.

The middle portion of the release bar 13 is provided with a laterally projecting finger 17 which is adapted to be engaged by a trigger 18 carried by a crank arm 19 which is rigid with a shaft 20 upon which the main plate 21 is mounted. The rock shaft 20 is journaled between upstanding ears 22 on the base plate, and the middle portion of the main plate 21 is contracted to provide a neck 21ª which fits between the upstanding ears 22 and is crimped at 23 to receive the shaft. A small retaining plate 24 extends across the mouth of the crimped portion 23 and engages a flattened side 20ª of the shaft 20, said retaining plate being secured by screws 25 to the main plate 21. The main plate is thus rigidly connected to the shaft 20, and when the trap is set the main plate assumes a substantially horizontal position with the crank arm 19 extending downwardly at right angles thereto in a substantially vertical position. The trigger 18 then bears against the top of the lateral finger 17 of the release bar 13 and prevents the said release bar from rocking and disengaging the detents 12 from the latch members 9. The spring 6 is thus locked in an inoperative position with the two ends thereof flexed downwardly against the base plate 1 and held in such a position by the latch members 9.

It will be obvious, however, that a slight amount of pressure exerted upon either end of the main plate 21 will tilt the said main plate, thereby rocking the shaft 20 and swinging the crank arm 19 to disengage the trigger 18 from the lateral finger 17. The release bar 13 will then rock upon its bearings and permit the detents 12 to disengage the latch members 9, whereupon the ends of the spring 6 will be released and will flex upwardly, thereby forcibly closing the jaws and causing them to grip any animal or object which may have been between the jaws at the time the trap was sprung. Both sets of the jaws 4 are simultaneously released so that when the trap is set in a tunnel or runway it will act in an equally efficient manner to catch an animal approaching from either direction. One specific construction of the trap has been shown by the drawings and described in detail for the purpose of illustrating the invention, although it will be understood that numerous modifications and changes can be made in the details of construction without departing in any manner from the spirit of the invention.

Having thus described the invention, what I claim as new and desire by Letters Patent is:—

1. An animal trap including a base, a plurality of independent sets of jaws carried by the base, and a treadle having a support intermediate its length and controlling all of the sets of jaws, said treadle being adapted to release all of said jaws when depressed upon either side of said support.

2. An animal trap including a base, independent and spaced sets of jaws carried by said base, a tilting plate arranged between the sets of jaws, a support therefor, a trigger carried by said plate, and means coöperating with the trigger and controlling said spaced sets of jaws, said tilting plate being adapted to spring the trap when depressed upon either side of its support.

3. An animal trap including a base, spaced and independent sets of spring actuated jaws carried by the base, independent latch members controlling the respective sets of jaws, a release bar engaging both latch members, and trip actuated means controlling the release bar.

4. An animal trap including a base, spaced and independent sets of jaws carried by the base, actuating means for the jaws, independent latch members controlling the respective jaws, a release bar engaging both of the latch members and provided with a trip finger, a tilting plate, and a trigger carried by the tilting plate and coöperating with the trip finger to release the bar when the plate is tilted.

5. An animal trap including a base, spaced and independent sets of jaws pivotally mounted upon the base, a spring strip applied to the base and formed with clearance openings adapted to receive the pivot ends of the jaws and engage the same to forcibly close the jaws when the spring is released, pivoted latch members extending across the ends of the spring to hold the spring in a flexed and inoperative position when the trap is set, a rocking release bar provided with detents adapted to engage the swinging ends of the latch members, a tilting plate, and trip means controlled by the tilting plate for holding the release bar in operative position when the trap is set.

6. An animal trap including a base, spaced and independent sets of jaws pivotally mounted on opposite ends of the base, a spring strip secured at an intermediate portion to the base and having the end portions thereof provided with clearance openings arranged to engage the pivot ends of the jaws to forcibly close the jaws when the spring is released, pivoted latch members extending transversely across the ends of the spring to hold the spring in a flexed and inoperative position when the trap is set, a rocking release bar provided with detents adapted to engage the swinging ends of the latch members and also provided with a trip finger, a tilting plate, and a trigger actuated by the tilting plate and arranged to engage the trip finger when the trap is set.

7. An animal trap including a base, a pair of pivoted jaws carried by the base, a spring engaging the pivot ends of the jaws to actuate the same, a swinging latch member extending across the spring to hold the same in inoperative position, a rocking release bar provided with a detent adapted to engage the latch member and also provided with a trip finger, a tilting plate, and a trigger actuated by the tilting plate and arranged for coöperation with the trip finger to lock the release bar against rocking movement and hold the trap in a set position.

In testimony whereof I affix my signature.

SIDNEY A. WHITLEY.